(No Model.)
W. L. STEWART.
BICYCLE BRAKE.
No. 576,912.
Patented Feb. 9, 1897.
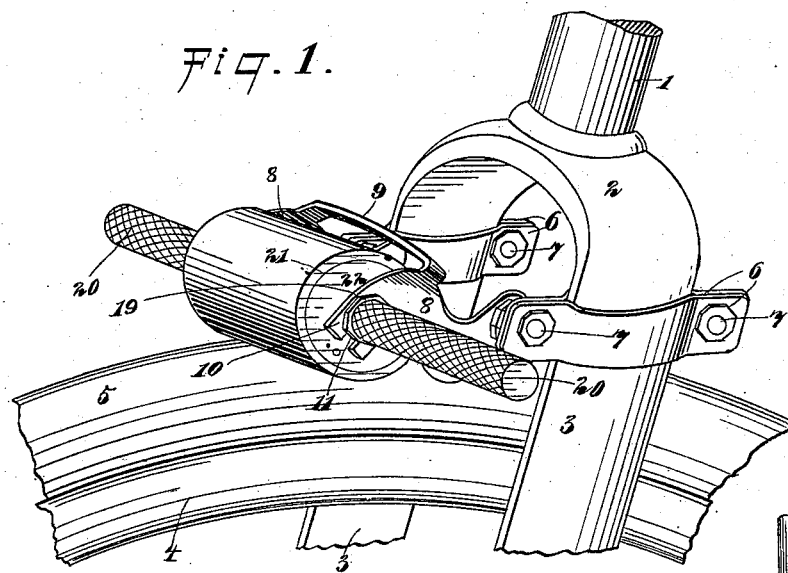
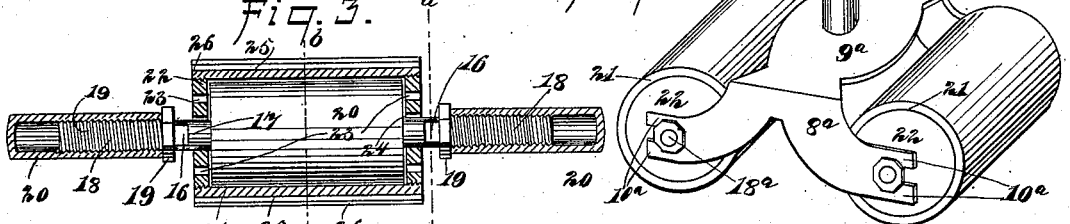
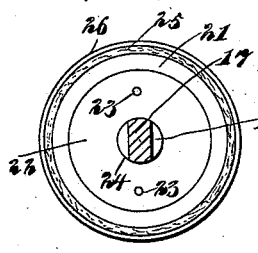 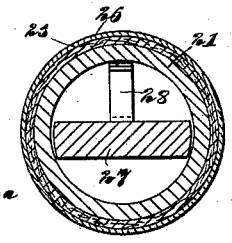 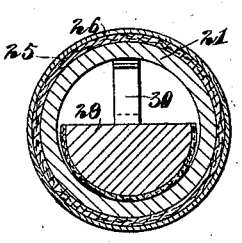
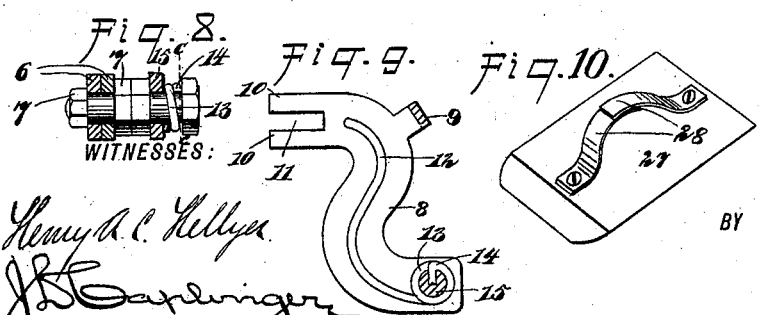
WITNESSES:
Henry A. C. Hellyer
J. L. Oardwinger
INVENTOR
W. L. Stewart.
BY
munn
ATTORNEYS.
THE NORRIS PETERS CO., PHOTO-LITHO., WASHINGTON, D.C.

UNITED STATES PATENT OFFICE.

WILLIAM L. STEWART, OF WILMERDING, PENNSYLVANIA.

BICYCLE-BRAKE.

SPECIFICATION forming part of Letters Patent No. 576,912, dated February 9, 1897.

Application filed May 19, 1896. Serial No. 592,106. (No model.)

*To all whom it may concern:*

Be it known that I, WILLIAM L. STEWART, of Wilmerding, in the county of Allegheny and State of Pennsylvania, have invented a new and Improved Bicycle-Brake, of which the following is a full, clear, and exact description.

This invention relates to certain improvements in brakes for bicycles and similar pneumatic-tired vehicles, and has for its object to provide a brake of a simple and inexpensive construction which shall be light and strong and adapted to generate sufficient friction to stop the rotation of the vehicle-wheels without injury to the materials of which the tires are formed.

Reference is to be had to the accompanying drawings, forming a part of this specification, in which similar characters of reference indicate corresponding parts in all the views.

Figure 1 is a perspective view showing a foot-brake embodying my improvements. Fig. 2 is a similar view showing the invention embodied in a hand or lever brake. Fig. 3 is a sectional view taken transversely through a foot-brake constructed in accordance with the invention. Fig. 4 is a section taken through the forward part of the brake in the plane indicated by the line $a\,a$ in Fig. 3. Fig. 5 is a view similar to Fig. 4, but taken in the plane indicated by the line $b\,b$ in Fig. 3. Figs. 6 and 7 are sectional views similar to Fig. 5, but showing modified forms of the brake. Fig. 8 is a sectional view taken through one of the pivots whereon the brake-frame is held. Fig. 9 is a sectional view taken in the plane indicated by the line $c\,c$ in Fig. 8 and showing the spring for holding the brake-frame raised, and Fig. 10 is a perspective view showing the shoe employed in the construction of the brake shown in Fig. 6.

Referring first to Figs. 1, 3, 4, 5, 8, and 9, 1 indicates the lower end of the steering-post of a bicycle, having a crown-brace 2, carrying the forks 3, wherein is journaled the steering-wheel, having a rim 4, provided with a tire 5 in the usual way.

6 6 indicate clip-plates, bent to fit opposite sides of the forks 3 and held together by bolts or screws 7 at their opposite ends, as shown in Fig. 1. To the clips are pivoted the rear ends of the side bars 8 of the brake-frame, said side bars being connected or tied together by a cross-piece 9 and having their forward ends bent down and forked, as shown at 10, the spaces 11 between the forks being adapted to receive flattened end portions formed on the axle, whereon are carried the frictional brake devices, as will be hereinafter described.

To hold the brake-frame normally raised, springs 12 are employed, said springs having their outer ends secured to the inner sides of the side bars 8, as shown in Fig. 9, and being coiled, as indicated at 13, on the pivot-bolts 15, whereon the brake-frame swings, said bolts being the continuations or end portions of the bolts 7, holding together the clip-bolts 6. The ends of the springs 12 are bent and engaged in recesses in the bolts 15, as shown at 14, so as to hold the springs in position for flexure.

17 indicates the axle or shaft whereon the frictional brake devices are carried, said axle having flattened end portions 16, engaging the spaces 11 between the forks 9 of the side pieces 8 of the brake-frame, so that the said axle or shaft is held against rotation, and to hold the axle in place its ends are screw-threaded, as shown at 18, to receive nuts 19 and sleeves 20, extending beyond the opposite sides of the vehicle-frame after the fashion of coasters, and adapted to receive the feet of the rider to permit the brake-frame to be swung pivotally, as is usual in foot-brakes, to bring its frictional brake devices into engagement with the wheel-tire.

On the central portion of the axle or shaft 17, between the side bars 8 of the frame, is fixed a cylindrical brake shoe or body 20, having by preference a canvas-covered surface, and around the said shoe 20 is arranged a sleeve or drum 21 of cylindrical form having open ends and of an interior diameter greater than that of the shoe, so that said casing is capable of movement to bring this interior face into contact with the canvas-covered face of the shoe.

The open ends of the casing or sleeve 21 are closed by screw-plugs 22, having apertures 23, which receive a spanner or other tool, so that they may be conveniently removed, and said plugs have central openings 24, through which the axle or shaft 17 passes, as shown in Figs. 3 and 4. The sleeve or casing 21 is provided with a wearing-surface 26, of rubber, canvas, or the like, between which and the sleeve is arranged a packing 25, of asbestos or the like, cemented or otherwise held in place and serving to prevent the heat generated by the frictional contact of the shoe or sleeve from being transmitted to the tire, so as to damage the same.

In operation when it is desired to use the brake the rider places his feet upon the sleeves 20, so as to press the casing or drum 21 of the brake device into frictional engagement with the tire 5 of the wheel, so that said casing or drum will be rotated, as will be readily understood. The opening 24, through which the shaft 17 passes, is of larger diameter than said shaft, so that when the sleeve or drum 21 is pressed into contact with the tire the shoe 20 on the central portion of the shaft or axle 17 will also be pressed into frictional engagement with the inner surface of the sleeve or drum 21, so as to impede or retard the rotative movement thereof and stop the wheel.

When the device is employed as a hand-brake, the construction shown in Fig. 2 will be preferably employed. In this form of the device the brake-frame is constructed with two series of oppositely-directed arms 8$^a$, united by a tie-bar 9$^a$, to which is connected the lower end of the brake-stem 9$^b$. The arms 8$^a$ are forked, as shown at 10$^a$, to receive the flattened ends of shafts 18$^a$, extending parallel to each other and carrying frictional brake devices comprising sleeves 21, having shoes engaging their interior surfaces similarly to the shoes 20, above described.

If desired, the form of shoe illustrated in Figs. 6 and 10 may be employed. In this form of the device the shoe 27 is formed of a flattened block, the opposite edges of which are adapted to engage the interior surface of the sleeve or casing 21 when the brake is put in operation, and said block is provided with upwardly-extending springs 28, arranged to normally support the sleeve 21 in proper position; or, if desired, the form of shoe indicated in Fig. 7 may be employed, wherein the shoe 29 is made substantially semicircular in cross-section and is provided with springs 30, extending upwardly similar to the springs 28, above described.

From the above description it will be seen that the improved brake is of an extremely simple and inexpensive construction and is especially well adapted for use on bicycles and similar pneumatic tires, since the friction employed to retard the movement of the wheel is not applied directly to the vehicle-tire, but is applied to the sleeve or casing 21, rotated from said tire; and it will also be obvious from the above description that the invention is susceptible of some modification without material departure from its principles and spirit, and for this reason I do not wish to be understood as limiting myself to the precise form and arrangement of the parts herein set forth.

Having thus described my invention, I claim as new and desire to secure by Letters Patent—

1. In a bicycle-brake or the like, the combination of a brake-frame having side pieces provided with forks, an axle having flattened end portions engaged between the forks of the side pieces, a shoe carried on the axle between said flattened portions, a loosely-mounted sleeve encircling the shoe and arranged to engage the tire, and removable plugs for the ends of said sleeve, said plugs being provided with apertures of a larger diameter than and adapted for the passage of the axle, said shoe being arranged to engage the interior of the sleeve when the brake-frame is moved to engage the sleeve with the wheel-tire, substantially as set forth.

2. A brake having a shoe, a sleeve in which the shoe is contained and a spring pressing the sleeve and shoe and normally holding the shoe out of engagement with the interior sides of the sleeve, the sleeve being capable of moving on the shoe so as to clamp the shoe against the curved inner side thereof, substantially as described.

3. A brake having a shoe, an expansive spring carried by the shoe, and a sleeve loosely inclosing the shoe and normally supported by the spring out of forcible contact with the shoe, and moving upon the application of pressure to forcible contact with the interior walls of the sleeve, substantially as described.

WILLIAM L. STEWART.

Witnesses:
GEO. L. BESWICK,
GEO. W. HOGE.